Figures 1, 2:
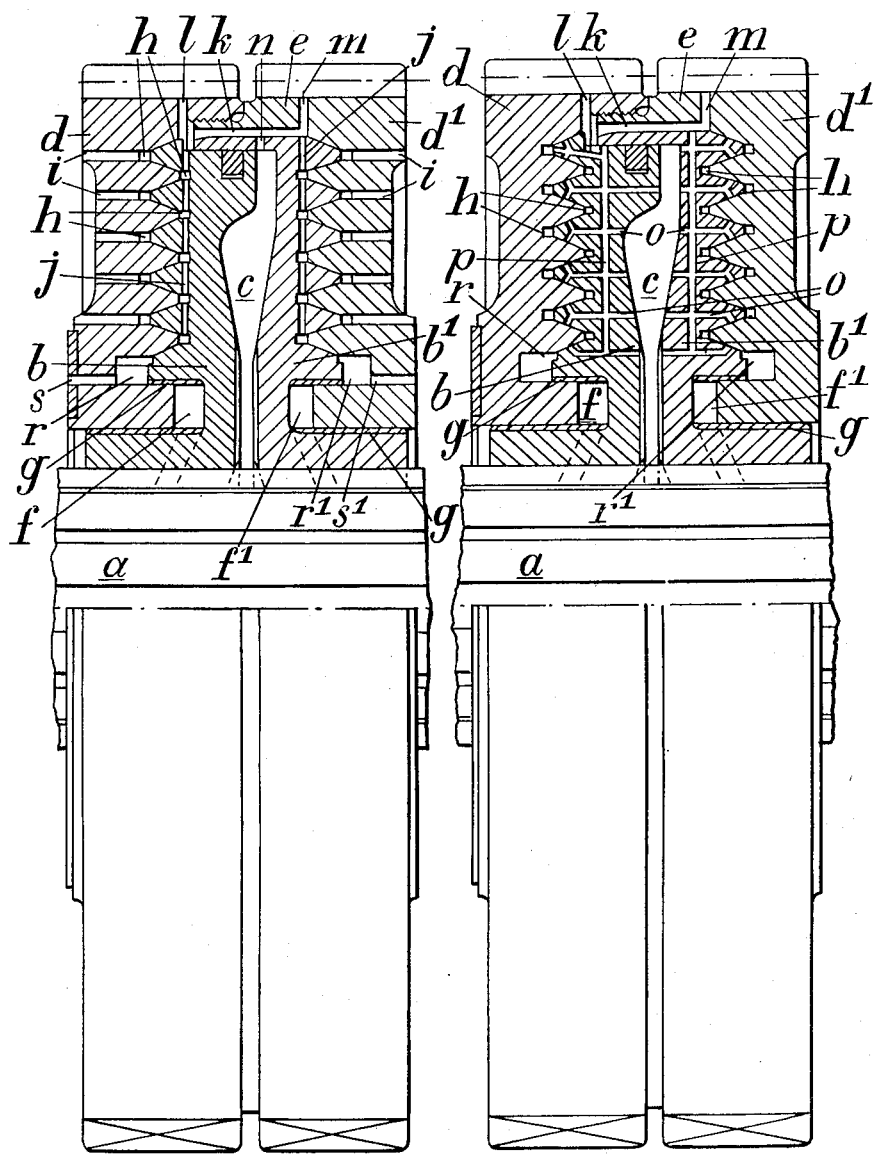

Feb. 14, 1956    T. HINDMARCH    2,734,607
FLUID COOLED AND OPERATED CLUTCHES
Filed Aug. 7, 1951

Inventor
T. Hindmarch

United States Patent Office 2,734,607
Patented Feb. 14, 1956

2,734,607

FLUID COOLED AND OPERATED CLUTCHES

Thomas Hindmarch, Chesham, England

Application August 7, 1951, Serial No. 240,717

Claims priority, application Great Britain
February 26, 1951

4 Claims. (Cl. 192—86)

This invention relates to a fluid pressure operated clutch of the kind having a pair of disc-like movable clutch members mounted back to back, axial with and for rotation with a shaft, and positioned within a circular hollow member axial with and freely rotatable in respect of said shaft, engagement of said clutch being effected by the introduction of fluid under pressure between said disc-like members whereby they are urged apart and to contact the inner surfaces of said hollow member by means of V grooved surfaces upon each.

This kind of clutch, if allowed to slip for any length of time, becomes overheated and it is the object of the present invention to overcome this disadvantage.

The invention consists in a pressure liquid operated friction clutch characterised in having channel means for effecting continuous liquid flow via the interengaging friction surfaces while the clutch is in operation.

The invention further consists in a construction as set forth in the preceding paragraph in which the liquid is the pressure liquid and flows to the interengaging surfaces by way of channels formed in one of the friction members and away from the interengaging surfaces by way of channels formed in the co-operating friction member.

With the object of further ensuring smooth operation of the clutch a series of channels may be provided through the face of the V members of the movable disc-like members to the inner pressure chamber so that oil is fed constantly to the V groove faces of the two engaging members to provide a film of oil between the faces of the engaging members. The presence of this oil allows of a certain amount of slip to the clutch thus taking care of maximum and minimum torques which may be encountered over and above the carrying capacity of the clutch. These channels may be conveniently positioned parallel to the axis of the clutch and be interconnected by radial channels connecting with the annular clearance space and the exterior of the clutch, thereby ensuring a continuous flow of oil from the pressure chamber via these channels to the clutch faces.

The oil is led away from the clutch faces by channel means which may be annular grooves of rectangular cross section, the points of the V's being left off, so that a rectangular cross section is formed by the grooves and the V's upon engagement of the clutch. Channels are provided connecting the annular grooves in the hollow member in the form of axial bores directly into the space around the outside of the hollow member or radial bores interconnecting the said annular grooves and connecting with the outside of the said member while the channels for the grooves in the disc-like members are preferably radial bores passing through the channels from one to the next, the outer end of which emerges into a cavity which is normally provided surrounding the periphery of the disc-like members and which is the clearance space between the cylindrical sealing wall on one of the latter members and the inner cylindrical face of the hollow member. This clearance space is provided with one or more bores connecting with the outer space. These latter bores may be in line with the bores connecting the grooves together. By this means air can enter the annular grooves to allow the clutch members to be more easily separated and excess oil can emerge when the clutch is engaged.

These holes in the periphery of the inner clutch members and in the outer clutch members permit oil to escape and thus give an even oil pressure throughout the clutch during engagement and rotation of the clutch. In addition, a series of peripheral holes may be provided between the pressure chamber and the said clearance space which avoids the building up of pressure at the periphery of the pressure chamber by reason of centrifugal force, which would hinder the disengagement of the clutch. These holes allow the oil to flow through the clutch and keep it cool.

The accompanying drawing shows, by way of example only, one embodiment of the invention in which:

Figure 1 is a part elevation and a part longitudinal section of the clutch on one plane, while Figure 2 is a part elevation and a part longitudinal section of the clutch on another plane.

The clutch shown in the drawing is incorporated in a toothed pinion whereby the pinion may be freely rotatable upon its shaft or may be drivingly attached thereto by means of a clutch.

The shaft $a$ which is shown in elevation is provided with splines with which the movable disc-like clutch members $b$, $b'$ engage and are thus capable of movement longitudinally of the shaft while moving circumferentially with the same. The cavity $c$ formed between the members $b$ and $b'$ communicates with oil ways formed in the shaft $a$ by which oil may be introduced to urge the members $b$ and $b'$ apart to engage them with the coacting clutch members $d$ and $d'$ which form the ends of the hollow cylindrical member $e$.

The inner clutch members $b$ and $b'$ are urged together to separate them from the outer clutch members, to disengage the clutch, by the introduction of oil under pressure to the cavities $f$ and $f'$ by way of oil ways formed in the shaft $a$, the oil pressure in the cavity $c$ being reduced or removed as necessary to allow the members to move. The outer clutch member, which is provided with teeth to form a pinion, is freely rotatable on the bearings $g$ when the clutch is disengaged, but is held fast when the clutch is engaged thus allowing the drive to be imparted by the shaft to the pinion or vice versa.

Annular grooves $h$ are formed at the bottom of the V grooves of the engaging surfaces, those on the outer member being connected by narrow channels $i$ with the exterior of the clutch while those at the bottom of the engaging surfaces of the inner members are connected by radial channels $j$ passing through the grooves from one to the next, the outer ends of each of which emerge into the cavity $k$ which surrounds the periphery of the inner clutch members. This clearance space is provided with bores $l$ and $m$ connecting with the space outside the clutch. These latter bores are conveniently situated in line with the bores $j$. By this means air can enter the annular grooves to allow the clutch members to be more easily separated and oil can emerge when the clutch is engaged.

The apices of the V-shaped projections between the V-shaped grooves are formed with flats in order to make the cross section of the annular grooves $h$ substantially rectangular.

A series of peripheral holes $n$ may be provided between the pressure chamber or cavity $c$ and the clearance space to avoid the building up of pressure at the periphery of the chamber by centrifugal force, These holes also serve the purpose of allowing the oil to flow through the clutch to keep it cool.

Oil ways are provided in the manner as shown in Figure 2, the section being taken on a plane other than that of Figure 1, the bores being provided in such positions as to avoid those of the previous figure. These bores are provided between the faces of the V members of the inner clutch members and the cavity $c$ so that oil is fed constantly to those faces of the V grooves to provide a film of oil between the interengaging surfaces of the clutch members. A continuous oil flow is maintained to the interengaging surfaces by way of bores $o$ in the inner clutch members and away from these surfaces by way of the bores $i$ in the outer clutch member. The former bores are conveniently made parallel to the axis of the shaft as shown at $o$ and are interconnected by radial channels $p$ connecting with the annular clearance space $k$ and the exterior of the clutch by way of the bores $l$ and $m$, thereby in addition ensuring a continuous flow of oil from the cavity $c$ via these bores to assist in cooling the clutch faces.

The annular spaces $r$ and $r'$ are also provided with axial bores $s$ and $s'$ to allow oil trapped therein to escape when the clutch is engaged.

It is to be understood that the foregoing description is by way of example only and that details for carrying the invention into effect may be varied without departing from the scope of the invention.

I claim:

1. Pressure liquid operated friction clutch comprising a rotatably hollow first clutch member having inner and outer faces, a rotatable second clutch member in the form of a disc having inner and outer faces mounted within and concentric of the first clutch member and adapted to be moved axially to engage with its outer face the inner face of the first clutch member to engage the clutch, means to introduce pressure liquid to the inner face of the disc to move the disc's outer face against the inner face of the first clutch member, the interengaging faces of the clutch members having V-shaped groove-like depressions with annular cavities in the form of annular grooves in the bottom of the same, channel means in the second clutch member by which the pressure liquid flows to the engaging faces of the clutch members while the clutch is in operation, the annular grooves in the first clutch member being connected by narrow axial bores with the exterior of the same, while the annular grooves in the second clutch member are interconnected by radial bores connected with an annular space around the second clutch member, said space being connected with the exterior of the first clutch member by bleed holes.

2. A pressure fluid operated friction clutch comprising a hollow cylindrical rotatable first clutch member having inner and outer faces, V-grooves on each inner face, a second rotatable clutch member mounted within and concentric to the first clutch member, said second clutch member including a pair of spaced discs movable axially of the first clutch member in opposite directions, each of said discs having inner and outer faces, V-grooves on the outer face of each disc engageable with the V-grooves of each inner face of the first clutch member, means to introduce liquid under pressure into the space between the discs to move the discs axially so that the respective V-grooves interengage, a series of ducts in each disc extending from the inner face to the outer face of each disc to feed the liquid continuously to the interengaging V-grooves during operation, and a series of ducts in the first clutch member extending from the inner face to the outer face of such member so that the liquid may flow away from the interengaging faces.

3. A pressure fluid operated friction clutch comprising a shaft, a first clutch member rotatably supported by the shaft and having inner and outer faces, V-grooves on the inner face of such member, a disc-like member mounted on the shaft for axial movement toward and away from the first clutch member and constituting a second clutch member, the said disc-like member having inner and outer faces, V-grooves on the outer face of the disc-like member engageable with the V-grooves of the first clutch member, means on the shaft cooperating with the inner face of the disc-like member to define a pressure chamber between such face and said means, further means to introduce liquid under pressure into the chamber to move the disc-like member axially so that the respective V-grooves interengage, a series of ducts in the disc-like member extending from the inner face of the said member to the outer face of said member to feed the liquid continuously to the interengaging V-grooves during operation, and a series of ducts in the first clutch member extending from the inner face to the outer face of such member so that the liquid may flow away from the interengaging V-grooves.

4. A pressure fluid operated clutch comprising a shaft, a first clutch member rotatably supported by the shaft and having inner and outer faces, a series of alternating teeth and depressions on the inner face of such member, an annular groove in the bottom of each depression, a disc-like member mounted on the shaft for axial movement toward and away from the first clutch member and constituting a second clutch member, the disc-like member having inner and outer faces, a series of alternating teeth and depressions on the outer face of the disc-like member engageable with the teeth and depressions of the first clutch member, means on the shaft cooperating with the inner face of the disc-like member to define a pressure chamber between such face and said means, further means to introduce liquid under pressure into the chamber to move the disc-like member axially so that the respective teeth and depressions engage, a duct extending longitudinally of each tooth of the disc-like member from the inner face of the disc-like member to a point adjacent the end of the tooth, a branch bore leading from the duct to each face of the teeth to feed the liquid continuously to the interengaging teeth and depressions during operation, and a duct extending from each annular groove in the first clutch member to the outer face of such member so that the liquid may flow away from the interengaging teeth and depressions.

References Cited in the file of this patent

UNITED STATES PATENTS

| 1,472,930 | Mayer | Nov. 6, 1923 |
| 2,289,991 | Paxman | July 14, 1942 |
| 2,407,699 | Hill | Sept. 17, 1946 |
| 2,559,337 | Balmforth | July 3, 1951 |

FOREIGN PATENTS

| 426,813 | France | July 19, 1911 |
| 756,810 | France | Dec. 15, 1933 |
| 879,303 | France | Feb. 19, 1943 |
| 74,351 | Norway | Nov. 29, 1948 |
| 257,698 | Germany | June 10, 1911 |
| 421,295 | Germany | Nov. 9, 1925 |